United States Patent [19]

Mintz et al.

[11] Patent Number: 4,624,764

[45] Date of Patent: Nov. 25, 1986

[54] SEPARATION OF DISPERSED PHASE FROM CONTINUOUS FLUID PHASE

[75] Inventors: Donald J. Mintz, Summit; Anthony M. Gleason, Westfield, both of N.J.

[73] Assignee: Exxon Research and Engineering Company, Florham Park, N.J.

[21] Appl. No.: 601,271

[22] Filed: Apr. 17, 1984

[51] Int. Cl.[4] .......................... B03C 5/02; C02F 1/48; C10G 33/02

[52] U.S. Cl. ..................................... 204/188; 55/107; 204/149; 204/186; 204/302; 204/306; 210/243; 210/748

[58] Field of Search ............................... 204/302–308, 204/186, 188, 149; 210/748, 243; 55/10, 107

[56] References Cited

U.S. PATENT DOCUMENTS

| | | | |
|---|---|---|---|
| 3,412,002 | 11/1968 | Hubby | 204/180 |
| 3,489,669 | 1/1970 | Ruhnke | 204/302 |
| 3,567,619 | 3/1971 | Brown | 204/302 |
| 3,616,460 | 10/1971 | Watson et al. | 204/302 |
| 3,799,855 | 3/1974 | Franse | 204/188 |
| 3,928,158 | 12/1975 | Fritsche et al. | 204/188 |
| 4,193,774 | 3/1980 | Pilat | 55/10 |
| 4,255,777 | 3/1981 | Kelly | 361/228 |
| 4,269,681 | 5/1981 | Watson et al. | 204/188 |
| 4,341,617 | 7/1982 | King | 204/302 |
| 4,469,582 | 9/1984 | Sublette et al. | 204/302 |

OTHER PUBLICATIONS

G. V. Jorgenson & E. Will, "Improved Ion Drag Pump", Jan. 1962, Review of Scientific Instruments, vol. 33, pp. 55–56.

Pohl & Schwer, "Particle Separations by Nonuniform Electric Field in Liquid Dielectrics, Batch Methods", J. Electrochemical Soc., 107,383 (1960).

Steutzer, "Electrohydrodynamic Precipitator", Rev. of Sci. Inst., 33, 1171 (1962).

*Primary Examiner*—John F. Niebling
*Assistant Examiner*—William Leader
*Attorney, Agent, or Firm*—Jay Simon

[57] ABSTRACT

Separation of dispersed phase (e.g., solid, gel, liquid or gas contiminant) from a continuous fluid background phase (liquid or gas) is achieved by injecting free charge into the phase mixture, which both induces an electric field within the mixture and effects charging of the dispersed phase. The interaction between the induced electric field and the charged contaminants causes migration of the contaminant and collection on preferably densely packed collector surfaces within the phase mixture. The dense packing reduces the migration path length and therefore increases the contaminant separation effectiveness. The collector surfaces can be provided by a bed of beads.

24 Claims, 1 Drawing Figure

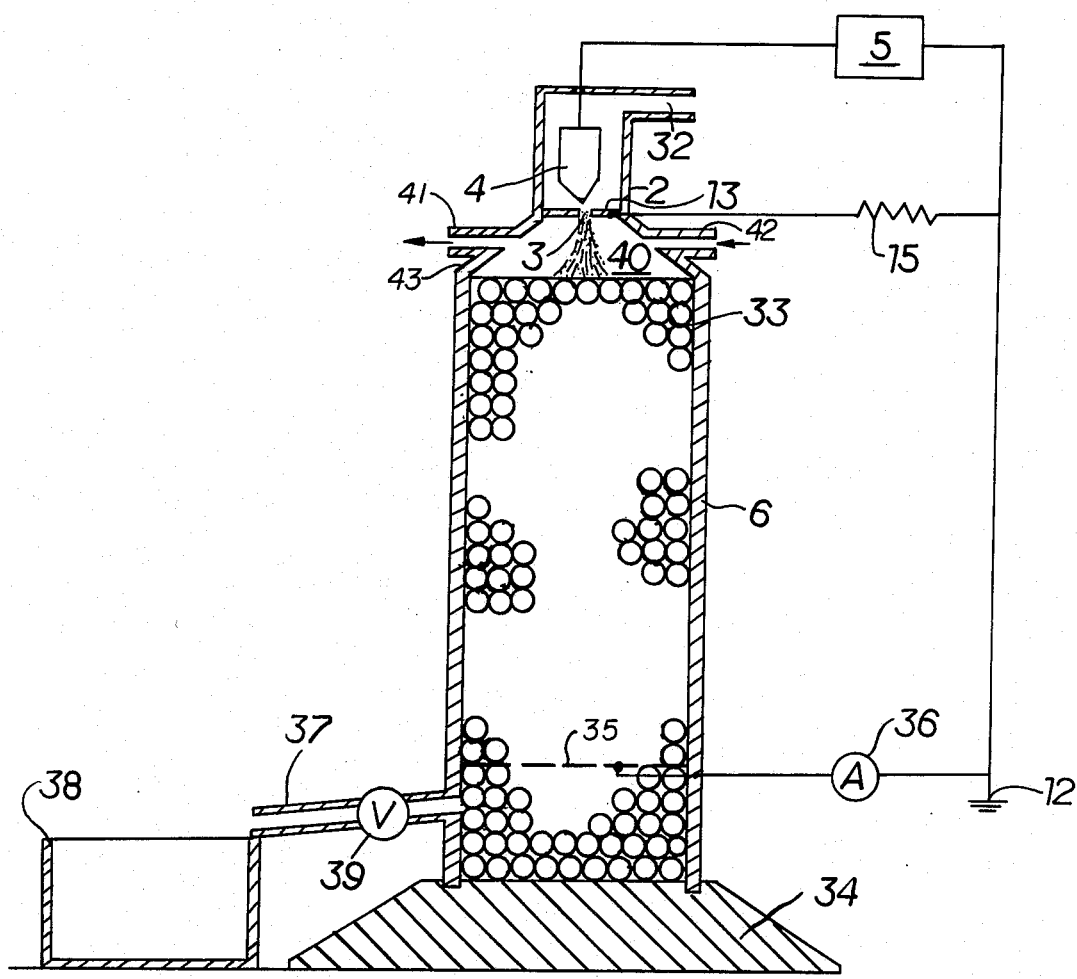

SEPARATION OF DISPERSED PHASE FROM CONTINUOUS FLUID PHASE

CROSS-REFERENCE TO RELATED APPLICATIONS

The specification of this application refers to another application of the present assignees filed on the same day as the present application and bearing the undermentioned assignee case reference: Ser. No. 601,254.

BACKGROUND OF THE INVENTION

This invention relates to a method and apparatus for use in the separation of a dispersed phase from a continuous background fluid phase together forming a phase mixture. The dispersed phase, which will be referred to as a "contaminant" hereinbelow, may be a solid, liquid, gel or gas or any combination of such contaminants when coexisting. Examples of contaminants are carbonaceous solids, metals and metal oxides (e.g. alumina fines), composites, water droplets, oil droplets, polymer chains and precipitates (such as wax crystals, asphaltenes, hot filtration sediment, and high molecular weight polar compounds). "Fluid phase" is used to indicate that the continuous background phase may be either a liquid or gas, liquid being the more usual. Examples of the application of this invention are the removal of dispersed water droplets from lube base stocks and other oils. Further possible applications of the invention are emulsion breakage, debasing fuel oil, removal of fine particles from refinery process streams, particulate separation in coal liquefaction and oil shale processing, and removal of coagulated metal rich fractions from residua.

DESCRIPTION OF THE PRIOR ART

Electrostatic separation techniques in various forms are known involving the application of an electrostatic field. Some of these involve the use of a filter bed consisting of beads or similar elements. For example, U.S. Pat. Nos. 4,139,441 (Bose), 3,928,158 (Fritsche et al), 3,799,855 (Franse), 4,059,498 (Crissman et al) and 4,022,675 (Chachere) all disclose an electrofiltration technique for removing dispersed solids from a liquid, in which a unidirectional nonuniform electric field is applied for separating the dispersed solids out on a bed of beads. Another similar technique is disclosed in U.S. Pat. No. 2,245,551 (Adams) in which petroleum emulsion is electrically treated to convert emulsion into a suspension of water droplets in oil, and then the droplets are separated out by stationary mass of glass fragment. U.S. Pat. No. 4,194,956 (Seguine) discloses removing wax from a wax-contaminated oil by passing the oil through interstitial spaces defined within a mass of ceramic beads, across which a non-uniform electric field is maintained.

An interesting development is taught in U.S. patent application Ser. No. 601,254 in the name of Donald J. Mintz, Arnold J. Kelly and Anthony M. Gleason, assigned to the present assignee and filed on the same day as the present application, in which no beads are used but an electric field is induced in the phase mixture to be clarified, for example by a charge injection technique using a charge injector, and the contaminant separated out on the inner wall surfaces of a vessel containing the charge injected phase mixture.

SUMMARY OF THE INVENTION

The apparatus according to the present invention is suitable for use in the separation of a dispersed phase (contaminant) from a continuous fluid phase, the two phases together forming a phase mixture. The apparatus comprises means arranged to introduce free charge (for example, by charge injection) that is net unipolar into said phase mixture. Free charge is positive or negative ions which, initially, are free to move through the continuous background phase. The apparatus also comprises a vessel for receiving and containing the phase mixture that has been charged by the charge introducion means. The introduced charge results both in an induced electric field being established within the phase mixture and the dispersed phase becoming charged. The induced field and the charged contaminants interact and this produces an electric force which causes migration of dispersed phase within the mixture. Finally, the apparatus comprises collector means (such as a bed of beads) inside the vessel providing at least one collector surface such that migrating dispersed phase forms into accumulations of charged dispersed phase on the collector surface or surfaces.

Alternatively, the apparatus comprises, in addition to the charge introducing means, an arrangement of collector elements for dispersed phase located in contact with the charged phase mixture such that the migrating dispersed phase forms into accumulations of charged dispersed phase on the surfaces of said collector elements.

The premise on which this invention is based is as follows, taking, as an example, a continuous liquid in which finely divided "particles" (e.g., droplets, bubbles or solid particles) of contaminant are disposed. When net charge is introduced into the liquid, the charge moves along the field lines of the resulting induced electric field. It is stressed that the electric field is not the result of an applied voltage to any electrodes but arises from the total injected charge distribution in the fluid and on the contaminants and collector surface region where separation occurs. If a dispersed phase particle intercepts the path of this moving charge, the charge will impact the particle and thereby charge the particle. In the absence of any collector surfaces within the vessel containing the charged contaminated liquid, particles charged in this manner will be driven by the induced field to the outer boundaries of the vessel containing the liquid. Thus, if the container is one foot in diameter, the average particle will have to migrate several inches before reaching the walls of the container. If the particles are small and the liquid is viscous, the time for this migration is large. During this time some of the charge on the particles will be reduced due to Ohmic losses. A reduction in the charge on a particle results in a reduction in collection efficiency. It is now recognised that the migration path length and hence the migration time are inversely related to the collection efficiency. Increased collection efficiency is accomplished by one or more collector surfaces in the bulk of the liquid.

This invention, in one aspect, can be regarded as consisting of two parts:

(1) Introducing excess charge (either net positive or net negative) into a multiphase mixture consisting of a continuous liquid or gaseous phase and one or more discontinuous phases which may be either gaseous, liquid, gel or solid; and (2) Moving the dispersed phase to a collector surface under the influence of the induced electric field, so that the mean migration path to the collector is small with respect to the cross-sectional dimensions of the vessel in which the phase mixture is contained.

Net unipolar excess free charge may be introduced via thermionic emission, field emission, photoelectron emission, or secondary electron emission. Other means of introducing excess free charge, obvious to those skilled in the art, such as radioiisotope decay may also be used.

The charge introduced into any stream to be decontaminated must be net negative or net positive. However, providing this requirement is met, then it is equally possible to introduce the excess charge using two streams of opposite but unequal levels of charge or alternating net positive and net negative streams for the purposes of agglomeration prior to collection, in the first case, or multilayer precipitation in the second case (e.g., collecting a net negative layer then a net positive layer, and so forth, of dispersed phase).

It is necessary that there be an excess of free charge inthe sense of a sufficient abundance that an effective migration of contaminant will occur.

It will be appreciated that the viscosity and conductivity of the background phase need to be relatively low such that the contaminant can reach the collector surface or surfaces before any appreciable leakage or depletion of its charge can take place such as would diminish to an ineffective level the electrical migration force acting on the contaminant. Typically the product of the viscosity and conductivity of the continuous liquid phase would be less than $10^{-7}$ centipoise/ohm-meter, but this should not be regarded as limitative in any way.

Suitably, the charge introducing means comprises a charge injector. Conveniently, the charge introducing means is positioned above the vessel for discharging charged mixture as a stream or spray downwardly into the vessel through a gas or vapor space. This gas or vapor space is provided to enable the charged fluid to exit the charge injector with high velocity to efficiently sweep out the injected charge and also to eliminate any charge dissipation path back to the charge injector. Such decoupling of the separation vessel from the charge injector is important for achieving a high level and high efficiency of charge injection. It is of no particular importance to the effective removal of contaminant whether the contaminated liquid is sprayed by the charge injector or simply issues as a continuous stream into the separation vessel, particularly at relatively high velocity throughputs in the charge injector. However, when the contaminated liquid is sprayed, the individual liquid droplets are in general separated from one another and this can be important where lower throughput velocities, closer to the drift velocity of the individual charges, are employed. It is, however, remarked that it is necessary that there be no contact between the spray or stream passing through the gas or vapor space and the surrounding separation vessel wall, in order to avoid charge dissipation. Where the continuous background phase is a gas, this can be achieved by introducing a secondary gas flow which provides an inner annular protective sheath on the surrounding wall surfaces. Suitably, the gas or vapor space will be provided by the ambient atmosphere separating the charge injector from the separation vessel, or it can be enclosed and a purge gas, e.g., nitrogen, circulated through the space to avoid any risk of explosion or chemical reaction. In addition, the purge gas helps to obtain uniform separation results irrespective of changes in ambient conditions, especially humidity, which can affect the rate of depletion of charge where an air space is present. In the absence of any such gas, reduced separation efficiencies are obtained. According to a development, the gas or vapor space is pressurized which can maintain a satisfactory throughput rate in the separation vessel even for rather viscous liquids and can increase the throughput rate for less viscous liquids.

It is to be noted that when using a charge injector to introduce the net unipolar free charge, it is important that the stream velocity through the charge injector is high enough to transport the charged stream away from the electrode region of the charge injector. The stream velocity needs to exceed the drift velocity of the individual charges relative to the liquid induced by the electric field produced by the charge injector electrodes. On the other hand, the liquid in the separation vessel needs to remain there long enough to enable contaminant migration to the vessel walls. This generally requires a much lower velocity throughput in the separation vessel than in the charge injector. Typical values for the throughput velocities in the charge injector and separation vessel are 1 m/sec and 1 cm/sec, respectively. In another embodiment the internal cross-sectional diameters of the separation vessel and the injector outlet diameter are for example 10 cms and 0.025 cms, respectively. These numerical values are purely exemplary and have no limiting character.

In a preferred form, the collector surfaces on which the migrating contaminant accumulates are provided by beads. Preferably, the vessel interior contains a bed of beads which may be stationary, moving or fluidized and closely packed across the cross-section of the vessel. In this way, the average migration path length is kept to a very small value compared with the cross-sectional dimensions of the vessel, resulting in high separation effectiveness. In addition, the smaller the size (diameter) of the beads, the more closely packed they will be and hence the shorter the migration path.

The beads should be made of low conductivity material, otherwise they will conduct-away the charge and deplete the induced electric field. Suitable materials from which the beads can be made are dielectric material, plastics material, ceramic material and glass.

In one particularly suitable form for use in separating a dispersed particulate contaminant from a continuous liquid phase, the bed of beads substantially but not completely fill the vessel and the charge introducing means is a charge injector positioned above the vessel for discharging charged mixture to be clarified into the vessel through a gas or vapor space, the vessel having an outlet for clarified liquid phase, which outlet may be in the side wall of the vessel below the top of the bed of beads, preferably close to the bottom.

Where the continuous background phase is a gas essentially similar considerations will apply. However, the volume throughput in the separation vessel will be considerably higher and this will necessitate a much longer and/or wider separation vessel. In addition, the flow path for the phase mixture between the charge introducing means and the separation vessel will need to be fully enclosed.

It will be appreciated that the invention is not limited to separating a single contaminant from the mixture. Two or more contaminant species may be separated, providing each of them forms, or the contaminant phases are combined to form, a dispersed phase within the background fluid phase.

It is to be noted that the collector surfaces need not necessarily be stationary. For example, the stream of charged fluid issuing from the charge injector could be seeded with collector beads before the stream enters the separation vessel and the beads removed from the fluid again at a downstream location, in the separation vessel itself for example. Alternatively, the bed of beads can be fluidized. One way in which this can be achieved is using a concentric cylinder arrangement for the separation vessel with the beads at least partially filling the annular gap between the two cylinders and pressurizing the gas space above the separation vessel to drive the charged fluid inside the cylinder into the annular space from below.

It will be appreciated that with the present invention, it is possible to refine the teaching of the aforesaid U.S. patent application Ser. No. 601,254, to achieve higher contaminant separation effectiveness. Furthermore, the separation apparatus is simple in construction.

BRIEF DESCRIPTION OF THE DRAWING

The foregoing and other objects and advantages of the invention will become apparent from the following description given, by way of example, with reference to the accompanying drawing, wherein the single FIGURE is a vertical sectional view through one form of the contaminant separation apparatus in accordance with the invention, which can be used for separating any one or more of carbon black particles, alumina and coke fines, water droplets and wax crystals from a white oil, but these phase combinations are purely exemplary.

DETAILED DESCRIPTION OF THE PREFERRED EMBODIMENTS

The contaminant separation technique to be described with reference to the single FIGURE is concerned with removal of solid and liquid contaminants from a continuous liquid background phase.

The contaminant separation technique involves three different stages, namely net unipolar charging of the contaminants, accumulation and growth of the contaminants on collector surfaces across or through which the charged, contaminant-laden liquid flows, and removal of the collected contaminant.

The first step in the separation technique is the production of free excess charge that is net positive or net negative in the otherwise electrically-neutral contaminant-laden stream. This can be effected using a charge injector such as disclosed in U.S. Pat. No. 4,255,777 in the name of A. J. Kelly and assigned to the present assignees, the contents of which are expressly incorporated herein by reference and which discloses charge injection predominantly or solely by field emission. It is to be understood that the invention is not limited to the above method of charge injection, but other techniques are possible instead such as electron beam and high energy particle radiation or photoemission. Electron beam, photoemission and field emission are all examples of electron emission. Alternatively, a volumetric charge introduction technique in the bulk of the fluid mixture can be used, such as photoionization and secondary ionization, or thermalization of high energy particle radiation. These examples all involve ionic dissociation within the liquid mixture.

Following the free charge introduction, the charged contaminant-laden stream exits the charge injection region, travels as a continuous jet or spray through a gas or vapor space and impacts and flows through the separation region. It is assumed that the excess charge density greatly exceeds the phase mixture background charge density (i.e., the density of a bipolar charge carrier which result in the conductivity of the background phase); then, the induced excess charge density will act on the individual charge carriers and drive them to the boundaries of the phase mixture. Some of the charge will be intercepted by the contaminants and the contaminants will thereby become charged. The interaction which then occurs between the charged contaminants and the induced electric field causes the contaminants to migrate towards the boundaries of the phase mixture.

The second step in the process involves the accumulation of the migrating contaminant on the collector surfaces disposed within the phase mixture. The charged dispersed contaminants will stream through the fluid boundary layers to the collector surfaces driven by the charge-induced field.

The material of which the collector surfaces are made is of no particular significance, except that it must not serve to provide one or more conduction plates which deplete or discharge the induced electric field or charges carried by the collected contaminants. In a preferred form, as already remarked, the collector surfaces are the surfaces of densely-packed beads which extend across the cross-section of a vessel or reservoir containing the charged phase mixture. Suitably, the beads can consist of dielectric material, or plastics or ceramic material, such as glass.

In the case of migrating liquid contaminant droplets, these are driven to, accumulate at and may coalesce on the collector surfaces. There may be some coalescence of these microscopic droplets to form into droplets of much larger size which become reentrained into or re-enter the phase mixture. In the case of gaseous contaminants, these congregate on the collector surfaces either without any coalescence or with some coalescence to agglomerate into large-sized bubbles, the bubbles becoming detached from the collector surface. Solid contaminant particles or a gel will accumulate on the collector surfaces and build up into a layer or coating on the collector surfaces. In some instances, pieces of agglomerated contaminant may break away from the collector surfaces.

The third step involves the removal or separation of the accumulated contaminant. For liquid contaminants this may entail some settling (or floatation, depending upon the density of the contaminant phase relative to that of the liquid) of the reentrained liquid contaminants, to form a distinct continuous contaminant phase, to enable separation of the two liquid phases. Other separation techniques which are well known in the art, for example centrifuging, can be used instead. Alternatively or in addition, liquid contaminant droplets which congregate on the collector surfaces without coalescense nevertheless leave calrified liquid in the bulk of the separation vessel interior which can then be discharged. Where the contaminant is a gas, similar effects will occur as in the case of liquid contaminants although the bubbles usually eventually grow to a size where they become released, due to factors such as buoyancy, from the collector surfaces and can be allowed merely to rise to the surface of the background liquid phase and be collected there or allowed to escape into the atmosphere. Where the contaminant is a solid, periodic cleaning of the collector surfaces by backflushing, solvent washing, heating, and other techniques which are well-known to those in the art can be used.

Reference is now directed to the particular embodiment shown in the FIGURE. Oil contaminated with dispersed solid particles such as carbon black is introduced through a supply line, diagrammatically shown at 32, into a charge injector which, in this example, is constructed in accordance with the teaching of the aforesaid U.S. Pat. No. 4,255,777, to which reference is made for a more complete disclosure of the construction and operation of the charge injector. However, in substance such a charge injector, as shown, essentially comprises an upright, suitably cylindrical, chamber 2 through which the contaminated oil passes, having a bottom wall 13, with an opening or orifice 3 at one end, and a sharply-pointed electrode 4 connected to a high voltage power supply 5, the tip of the electrode 4 being located closely adjacent to, and in axial alignment with, the opening 3. The chamber bottom wall 13 serves as a second electrode which is maintained at a lower voltage, relative to earth, than pointed electrode 4, by means of a connection to earth from the lateral wall of the chamber 2, which can be a direct connection or, as shown, through a resistance element 15. Charge is injected by the electrode pair 4, 13, predominantly by field emission into the mixture issuing through the orifice 3 and streams or sprays, through air gap 40 communicating with the atmosphere through pipe 41, into separation vessel or reservoir 6 located below the charge injector 1. The stream issuing downwardly through opening 3 may break up into a spray at a short distance below the opening 3, depending on the charging potential of the charge injector, but the existence of a spray is not critical to the effective operation of the contaminant separation apparatus, as explained above.

In a modification, a purge gas e.g., nitrogen, may be circulated through gas space 40, which is enclosed by a frustro-conical cap 43 of the separation vessel on which the charge injector body is mounted, using inlet and outlet pipes 42, 41 extending through the wall of cap 43. In another development, the pipes 42, 41 are used for pressurising the gas space 40.

The injector 1 injects free charge of single polarity (positive or negative) into the contaminated oil stream and this stream issues from the injector downwardly through the gap 40 onto a bed of densely-packed beads 33 which fill substantially the entire inside space of vessel 6 which conveniently is an upright, preferably cylindrical, glass columnar vessel supported on a base stand 34. A metal screen or gauze 35 to which a wire is attached and grounded through an ammeter 36 collects the charge carried by the oily liquid in the separation vessel. The screen, 35 is shown with beads 33 above and below it, but instead the screen could serve as a supporting screen with the beads positioned on top of it, only. The ammeter provides a measure of the charge level and, with the fluid flow rate, the charge density which is useful in determining the operating parameters of the charge injector, and a complete electrical circuit for the injected charge. An outlet 37 is provided in the wall of the vessel at a location below the top of the bed of glass beads 33, and preferably close to the bottom on the bed. The outlet pipe 37 is directed at a shallow angle below the horizontal and discharges into a collector vessel 38 for clarified oil. A controllable valve 39 in pipe 37 is periodically opened to release clarified oil from the bottom region of vessel 6 into container 38.

In operation, with valve 39 closed and already clarified white oil covering the beads 33, excess charge of one polarity is injected by the charge injector 1 into the stream of contaminated white oil. The charged oil flows over the bed of beads 33 and charged white oil already in vessel 6. Preferably, as shown, the level of white oil in vessel 6 just covers the top layer of beads, in order to keep the migration path length from the top surface of the white oil to the nearest glass beads to a minimum, but this is not essential. Migration of the contaminants such as carbon black particles in this example then occurs within the white oil towards the inside wall surfaces of the vessel 6, but the migrating particles encounter the outer surfaces of the beads generally before reaching the vessel wall surfaces and so become deposited principally on the beads. The clarity of the while oil increases towards the bottom of vessel 6, and clarified oil is removed through outlet pipe 37 by opening valve 39. The clarified oil can be periodically tapped off, while ensuring that the oil level in separation vessel 6 never reaches the change injector, or preferably is continuously run off at a rate controlled by the setting of valve 39 and the feed of contaminated oil to the charge injector regulated manually or automatically to maintain the oil level just covering the beads. From time to time, it may be necessary to replace beads 33 with new ones or to remove the soiled beads, clean them and then re-introduce them to vessel 6. The foregoing description will now be illustrated by way of example.

EXAMPLE 1

The contaminated white oil mixture was made up from white oil (Marcol 52—manufactured by Exxon Company USA) containing 20 ppm of carbon black particles with a mean particle size of approximately one micron. A stream of this contaminated oil was pumped at a rate of 2 ml/sec. past a charge injector such as described in the aforesaid U.S. Pat. No. 4,255,777, operating at a potential of 6,000 volts between its pointed emitter electrode 4 and orifice electrode 13 and passing from 1 to 2 microamps of current. In this example, the glass vessel 6 had a height of 8 inches and a diameter of 2 inches and was substantially filled with $\frac{1}{4}$ inch diameter glass beads. There was a gas space of 2 inches between the orifice electrode of the charge injector and the top of the bed of glass beads. The valve 39 was left permanently open, the beads were fully covered and when the charged stream of contaminated while oil was passed through the bed of glass beads, the carbon black was observed to precipitate out and be held strongly on the surfaces of the glass beads, to give an effluent stream, leaving the vessel 6 through outlet pipe 37 with less than 0.2 ppm of carbon black particles after one pass. The current as read on ammeter 36 divided by the flow rate resulted in a charge density during the run which exceeded 0.01 coulombs/meter$^3$. It was observed that a bed of lead shot was not as effective as a bed of glass beads. Also, it was observed that the glass beads lost some of their effectiveness after their surface was coated with the conducting carbon black particles. Glass, therefore, was a preferred material for separating out the carbon black contaminant, but the present invention is not limited solely to glass or only ceramic materials. Thus, plastics and other dielectric materials of low conductivity are also suitable for use as the beads making up the contaminant collection bed. The upper limit of conductivity that can be tolerated for the material from which the beads are made will depend upon the contaminant migration velocity (governed by the viscosity of the white oil) and the charge level achieved with the charge injector.

FURTHER EXAMPLES

With apparatus identical to that described with reference to the single accompanying FIGURE, contaminants comprising coke fines, water droplets, wax crystals, and alumina fines with diameters ranging from 0.5-50 microns and in concentrations of less than 500 ppm were separated from white oil and white oil/heptane mixtures with separation efficiencies exceeding 95% in each case.

What is claimed is:

1. A method for use in the separation of a dispersed phase from a continuous liquid phase, the two phases together forming a phase mixture, by producing migration of dispersed phase within the phase mixture, said method comprising the steps of:
   (1) introducing free charge that is net unipolar into said phase mixture, at least predominantly by electron emission which causes the continuous phase to act as a medium through which volumetric distribution of the introduced charge takes place, there being a sufficient excess of free charge introduced such that the volumetric charge distribution causes, in a vessel containing a quantity of the charged phase mixture, both an electric field to be induced in the mixture and the dispersed phase to become charged, and the induced electric field and the charge on the dispersed phase interact to produce an electrical driving force acting on the dispersed phase so that said migration is due substantially to said driving force; and
   (2) allowing the migrating dispersed phase to accumulate within said phase mixture adjacent to at least one collector surface of dispersed phase collector means disposed within the vessel in contact with said phase mixture.

2. A method as claimed in claim 1 wherein the free charge is introduced into a stream of said mixture, at least predominantly by field emission, and the charged stream is passed through a gas or vapor space, before entering said vessel, for minimizing charge dissipation from the charged phase mixture in said vessel back to where the free charge introduction took place.

3. A method as claimed in claim 2, wherein said gas space is enclosed and the enclosed space is pressurized.

4. A method as claimed in claim 2, wherein said gas space is enclosed and a purge gas is flowed through said gas space.

5. A method as claimed in claim 1, wherein the dispersed phase comprises solid particles.

6. A method as claimed in claim 1 wherein the free charge is introduced without producing ionic dissociation within the phase mixture.

7. A method as claimed in claim 1, wherein the vessel interior contains a bed of beads of low electrical conductivity which are closely packed across the cross-section of the vessel and which serve as said dispersed phase collector means.

8. A method for use in the separation of a dispersed phase from a continuous liquid phase, the phases together forming a phase mixture, by producing migration of dispersed phase within the phase mixture, said method comprising the steps of:
   (a) introducing free charge that is net unipolar into the phase mixture in such manner as to cause the continuous phase to act as a medium through which volumetric distribution of the introduced charge takes place:
   (b) passing the charged phase mixture into a vessel in which charged phase mixture and at least one collector surface of dispersed phase collector means disposed within the vessel are brought into contact with one another, the charged phase mixture, before entering said vessel, being directed as a stream through a gas or vapor space for minimizing charge dissipation from the charged phase mixture in said vessel back to where the free charge introduction took place, there being a sufficient excess of free charge introduced such that the volumetric charge distribution causes, in said vessel, an electric field to be induced in the phase mixture and the dispersed phase to become charged, and the induced electric field and the charge on the dispersed phase interact to produce an electrical driving force acting on the dispersed phase so that said migration is due substantially to said driving force; and
   (c) allowing the migrating dispersed phase to accumulate within said phase mixture in said vessel adjacent said collector surface(s).

9. A method according to claim 8, wherein the gas or vapor space is enclosed and a purge gas is flowed through said gas space.

10. A method as claimed in claim 8, wherein the free charge is introduced predominantly by electron emission.

11. A method as claimed in claim 8, wherein the free charge is introduced without producing ionic dissociation within the phase mixture.

12. A method as claimed in claim 8, wherein the vessel interior contains a bed of beads of low electrical conductivity which are closely packed across the cross-section of the vessel and which serve as said dispersed phase collector means.

13. A method of separating a dispersed phase from a continuous liquid phase, the phases together forming a liquid phase mixture, by producing migration of dispersed phase within the phase mixture, said method comprising the steps of:
   (a) flowing a stream of the phase mixture past a pointed high potential electrode at sufficient velocity that free charge that is net unipolar is injected by field emission into the liquid mixture and is conveyed by the flowing stream away from the high potential electrode, the free charge being injected into the phase mixture stream in such manner as to cause the liquid to act as a medium through which volumetric distribution of the injected charge occurs;
   (b) causing the charged stream to enter into a separation vessel through a gas or vapor space for minimizing charge dissipation from the charged phase mixture in the separation vessel back to where the free charge introduction took place, there being a sufficient excess of free charge introduced such that the volumetric charge distribution causes an electric field to be induced in the mixture in the vessel and the dispersed phase there to become charged, and the induced electric field and the charge on the dispersed phase interact to produce an electrical driving force acting on the dispersed phase so that said migration is due substantially to said driving force; and (c) maintaining the liquid mixture in the vessel for sufficient time for dispersed phase to migrate to, and accumulate adjacent, at least one collector surface of disposed phase collector means disposed within the vessel in contact with the charged liquid mixture therein.

14. Apparatus for use in the separation of a dispersed phase from a continuous liquid phase, the phases together forming a phase mixture, by producing migration of dispersed phase within the phase mixture, said apparatus comprising:

(a) means arranged to introduce free charge that is net unipoler into the phase mixture in such manner as to cause the continuous phase to act as a medium through which volumetric distribution of the introduced charge takes place;

(b) a separator comprising a vessel in which, in use of said apparatus, phase mixture, charged by the free charge introducing means, and at least one collector surface of dispersed phase collector means disposed within said vessel are brought into contact with one another;

(c) flow control means operable for retaining a body of said charged phase mixture in the vessel and for discharging substantially dispersed-phase-free continuous liquid phase from the vessel, continuously or periodically; and (d) a gas or vapour space which separates the phase mixture in the vessel from the free charge introducing means and through which the free charge introducing means is arranged to direct a stream of charged phase mixture before entering said vessel, for minimizing charge dissipation from the charged phase mixture in said vessel back to the free charge introducing means, said free charge introducing means being arranged to introduce a sufficient excess of free charge such that the volumetric charge distribution causes, in said body of charged phase mixture in said vessel, an electric field to be induced in the phase mixture and the dispersed phase to become charged, and the induced electric field end the charge on the dispersed phase interact to produce an electrical driving force acting on the dispersed phase so that said migration is due subatantially to said driving force, the dispersed phase migration causing dispersed phase to migrate to, and accumulate adjacent, said collector surface(s), leaving substantially dispersed-phase-free continuous liquid phase for discharge from said vessel by said flow control means.

15. Apparatus according to claim 14, wherein said means defining said dispersed phase collection region comprises a vessel having a base and a top and said free charge introducing means is positioned spaced away from the vessel top and arranged to direct said stream of charged phase mixture into said vessel through an opening in the top thereof.

16. Apparatus as claimed in claim 14, wherein the gas space is enclosed and means are provided for flowing a purge gas through said enclosed space.

17. Apparatus as claimed in claim 14, wherein said gas space is pressurized.

18. Apparatus as claimed in claim 14, wherein said gas space is exposed to the ambient atmosphere.

19. Apparatus as claimed in claim 14, wherein the free charge introducing means comprises a charge injector arranged to inject free charge, at least predominantly by field emission, into the phase mixture.

20. Apparatus as claimed in claim 14, wherein the dispersed phase collector means comprises a bed of beads which are closely packed across the cross-section of the vessel, the beads being made of dielectric material.

21. Apparatus as claimed in claim 14, wherein the dispersed phase collector means comprises a bed of beads which are closely packed across the cross-section of the vessel, the beads being made of plastics material.

22. Apparatus as claimed in claim 14, wherein the dispersed phase collector means comprises a bed of beads which are closely packed across the cross-section of the vessel, the beads being made of ceramic material.

23. Apparatus as claimed in claim 14, wherein the dispersed phase collector means comprises a bed of beads which are closely packed across the cross-section of the vessel, the beads being made of glass.

24. Apparatus for use in the separation of a dispersed phase from a continuous liquid phase, the phases together forming a phase mixture, by producing migration of dispersed phase within the phase mixture, said apparatus comprising:

(1) means arranged to introduce free charge that is net unipolar into the phase mixture in such manner as to cause the continuous phase to act as a medium through which volumetric distribution of the introduced charge takes place;

(2) a separator comprising:
(i) an arrangement of a plurality of closely packed collector elements for dispersed phase and
(ii) means defining a dispersed phase collection region in which, in use of said apparatus, phase mixture, charged by the free charge introducing means, and said arrangement of collector elements are brought into contact with one another;

(3) flow control means operable for retaining a body of said charged phase mixture in said dispersed phase collection region and for discharging substantially dispersed-phase-free continuous liquid phase from said dispersed phase collection region continuously or periodically; and (4) a gas or vapor space which separates the dispersed phase collection region from the free charge introducing a means and through which the free charge introducing means is arranged to direct a stream of charged phase mixture before entering said collection region, for minimizing charge dissipation from the charged phase mixture in said collection region back to the free charge introducing means, said free charge introducing means being arranged to introduce a sufficient excess of free charge such that the volumetric charge distribution causes, in said body of charged phase mixture in said collection region, an electric field to be induced in the phase mixture and the dispersed phase to become charged, and the induced electric field and the charge on the dispersed phase interact to produce an electrical driving force acting on the dispersed phase so that said migration is due substantially to said driving force, the dispersed phase migration causing dispersed phase to migrate to, and accumulate adjacent, said collector elements, leaving substantially dispersed-phase-free continuous liquid phase for discharge from said separator by said flow control means.

* * * * *